(12) United States Patent
Heitkamp

(10) Patent No.: US 8,006,927 B2
(45) Date of Patent: Aug. 30, 2011

(54) ATTENUATED SEATBELT STOPPER

(75) Inventor: Eric M. Heitkamp, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 153 days.

(21) Appl. No.: 12/474,847

(22) Filed: May 29, 2009

(65) Prior Publication Data

US 2010/0301151 A1    Dec. 2, 2010

(51) Int. Cl.
   *B65H 75/48*    (2006.01)
(52) U.S. Cl. .................... 242/379.1; 242/381
(58) Field of Classification Search .............. 242/379, 242/379.1, 381
   See application file for complete search history.

(56) References Cited

U.S. PATENT DOCUMENTS

| | | | |
|---|---|---|---|
| 2,639,913 A | 5/1953 | Reynolds | |
| 3,442,466 A | 5/1969 | Fritsche | |
| 3,666,198 A | 5/1972 | Neumann | |
| 3,765,700 A | 10/1973 | Littmann | |
| 3,881,667 A * | 5/1975 | Tandetzke | 242/384.3 |
| 3,952,967 A | 4/1976 | Barile et al. | |
| 5,611,498 A | 3/1997 | Miller, III et al. | |
| 5,836,534 A | 11/1998 | Böhmler | |
| 6,302,246 B1 | 10/2001 | Näumann et al. | |
| 6,568,621 B2 * | 5/2003 | Hiramatsu et al. | 242/379.1 |
| 6,682,009 B1 | 1/2004 | Frank | |
| 6,712,305 B2 | 3/2004 | Palliser et al. | |
| 6,789,761 B2 * | 9/2004 | Glinka | 242/379.1 |
| 7,025,297 B2 | 4/2006 | Bell et al. | |
| 7,152,824 B2 * | 12/2006 | Shiotani et al. | 242/379.1 |
| 2008/0017743 A1 | 1/2008 | Hiramatsu et al. | |

* cited by examiner

*Primary Examiner* — Sang Kim
(74) *Attorney, Agent, or Firm* — Rankin Hill & Clark LLP

(57) ABSTRACT

A force limiting device for use with a safety belt retractor is provided. The safety belt retractor includes a spool and a safety belt webbing attached to and wound around the spool for payout of the webbing under the influence of forwardly directed movement of a vehicle occupant. The force limiting device comprises a fixed member, a shaft connected to the fixed member and a coupling received on the shaft and operatively connected to the spool. The coupling is configured to move along the longitudinal extent of the shaft towards the fixed member during payout of the webbing. Engagement of the coupling with the fixed member prevents further payout of the webbing. The shaft is configured to limit movement of the coupling along the shaft during payout of the webbing to control effective belt force on the vehicle occupant during a crash condition.

18 Claims, 5 Drawing Sheets

ATTENUATED SEATBELT STOPPER

BACKGROUND

Exemplary embodiments herein relate to an attenuated stopper for a seatbelt system on a vehicle.

A seatbelt system for a vehicle typically has a seatbelt retractor that serves to retract a seatbelt webbing into a housing which is attached to the vehicle body. The belt webbing is wound upon a spool rotatably supported in the housing. When the webbing is drawn out or protracted, the spool winds a retraction spring, which later retracts the unused portion of the belt webbing onto the spool or withdraws the webbing into the housing when not in use. During a crash condition, the seatbelt retractor has a lock that limits the extension of the seatbelt webbing from the housing. The lock may be actuated by an inertial sensor, which responds to changes in vehicle speed, such as those that occur during the crash. When a large deceleration is detected, the inertial sensor triggers the lock of the seatbelt retractor to secure the webbing in place during the crash.

In a locked condition, the belt webbing restrains the vehicle occupant from moving forward during a crash condition. Although the seatbelt has some give, the restraining force on the vehicle occupant can be significant. To address this force, manufacturers generally use a load limiting device, such as a torsion bar, to absorb energy from the forward movement of the vehicle occupant in a controlled manner. Consequently, the vehicle occupant is gradually slowed rather than suddenly stopped during the crash. However, torsion bars can be complex and expensive to form, and generally are not easily adaptable to different conditions, such as different vehicle characteristics, or different sizes and weights of vehicle occupants.

BRIEF DESCRIPTION

In accordance with one aspect, a force limiting device for use with a safety belt retractor is provided. The safety belt retractor includes a spool and a safety belt webbing attached to and wound around the spool. The spool is rotatable to wind in the webbing and to payout the webbing under the influence of forwardly directed movement of a vehicle occupant. The force limiting device comprises a fixed member, a shaft connected to the fixed member and a coupling received on the shaft. The coupling is configured to move along the longitudinal extent of the shaft. The coupling is operatively connected to the spool and moves towards the fixed member during payout of the webbing. Engagement of the coupling with the fixed member prevents further payout of the webbing. The shaft is configured to limit movement of the coupling along a longitudinal extent of the shaft during payout of the webbing to control effective belt force on the vehicle occupant during a crash condition.

In accordance with another aspect, an attenuated seatbelt stopper is operatively connected to a spool of a seatbelt retractor for limiting rotation of the spool during a crash condition. The seatbelt stopper comprises a fixed member, a threaded shaft connected to the fixed member and an internally threaded coupling threadedly received on the shaft. A section of the shaft has a varying thread pitch along its longitudinal extent for crash performance. The coupling is operatively connected to the spool and moves toward the fixed member during payout of the webbing. Engagement of the coupling with the fixed member prevents further payout of the webbing. Engagement of the coupling with the varying thread pitch of the shaft increases the force required to turn the coupling on the shaft during payout of the webbing which, in turn, controls effective belt force on the vehicle occupant.

In accordance with yet another aspect, a method of controlling seatbelt force on a vehicle occupant during a crash condition is provided. A threaded shaft and an internally threaded coupling are provided. The coupling is threadedly engaged on the shaft. The coupling is operatively connected to a spool of a seatbelt retractor such that the coupling moves along the shaft as the spool rotates to payout webbing under the influence of forwardly directed movement of a vehicle occupant. The coupling is moved along the longitudinal extent of the shaft. The force required to move the coupling on the shaft during a crash condition is increased to control the rate of increase of belt force on the vehicle occupant.

DETAILED DESCRIPTION

Figure 1:
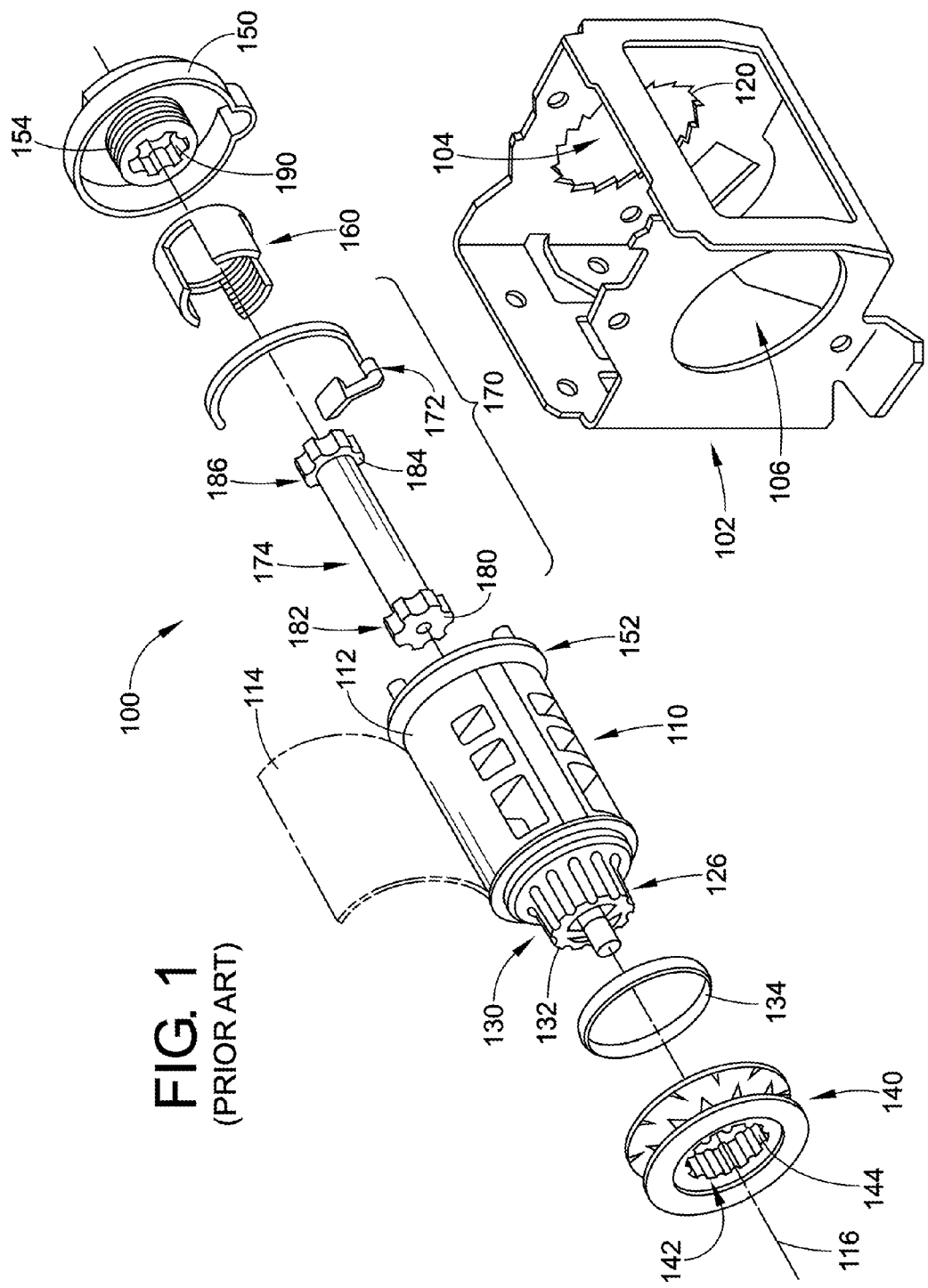
FIG. 1 is an exploded perspective view of a conventional safety belt retractor.

It should, of course, be understood that the description and drawings herein are merely illustrative and that various modifications and changes can be made in the structures disclosed without departing from the present disclosure. It will also be appreciated that the various identified components of the attenuated seatbelt stopper disclosed herein are merely terms of art that may vary from one vehicle manufacturer to another and should not be deemed to limit the present disclosure. All references to direction and position, unless otherwise indicated, refer to the orientation of the attenuated seatbelt stopper illustrated in the drawings and should not be construed as limiting the claims appended hereto. Like numerals refer to like parts throughout the several views.

Referring now to the drawings wherein the showings are for purposes of illustrating one or more embodiments only and not for purposes of limiting the same, FIG. 1 illustrates a conventional seatbelt retractor 100. The seatbelt retractor 100 includes a housing or frame 102, which is connected to a vehicle body (not shown), having a first opening 104 and a second opening 106. A spool 110 is rotatably supported on the housing 102. The spool 110 comprises a central body 112 about which a seatbelt or seatbelt webbing 114 is wound. The spool 110 is configured to rotate about an axis of rotation 116 in a belt retraction direction and a belt withdrawal direction. The first opening 104 of the housing 102 includes a circular array of ratchet teeth 120 orientated to engage a pawl (not shown) to block rotation of the spool 110 in the belt withdraw direction. A return spring (not shown) of known construction is attached between the housing 102 and the spool 110 to retract the webbing 114 after it has been extended. A drive gear 126 is integrally formed on a first end 130 of the spool 110 and includes a plurality of drive teeth 132. A ring 134 positioned on the body 112 surrounds the drive gear 126. A sleeve 140 is supported on the spool 110 for rotation therewith. Particularly, the sleeve 140 defines an opening 142 having teeth 144 formed therein. The teeth 144 are configured to matingly engage the teeth 132 of the drive gear 126.

A fixed member or stopper 150 is connected to a second end 152 of the spool 110 opposite the drive gear 126. A threaded shaft 154 is connected to the fixed member 150 and is axially aligned with the rotational axis 116 of the spool 110. A coupling or nut 160 is threadingly received on the shaft 154. The coupling 160 is operatively connected to the spool 110 and moves toward the fixed member 150 during payout of the webbing 114. Engagement of the coupling 160 with the fixed member 150 prevents further payout of the webbing 114.

A force limiting device 170 is internally supported on the spool 110 and is operable to limit the load experienced by the vehicle occupant due to the webbing 114 in the event of a vehicle collision. In this conventional embodiment, the force limiting device 170 includes a bending element 172 and a torsion bar 174. The bending element 172 is fixed to the second end 152 of the spool 110. The torsion bar 174, which is coaxial with the spool 110, is housed within the body 112 of the spool. As shown, the torsion bar 174 has an elongated, cylindrical configuration. A first spur gear 180 is attached to a first end 182 of the torsion bar and a second spur gear 184 is attached to a second end 186 of the torsion bar. The first spur gear 180 is operatively associated with the drive gear 126 of the spool 110. The second spur gear 184 is operatively associated with the threaded shaft 154.

Particularly, an inner surface 190 of the threaded shaft 154 has a gear configuration to matingly engage the second spur gear 184. The torsion bar 174 can be made from a ductile metal that enables the second end 186 of the torsion bar to be twisted up to five or six complete revolutions, relative to the first end 182, without breaking. The torsion bar 174 generally does not rotate during normal driving operation of the vehicle, but only in the event of a vehicle collision or similar occurrence for which the load limiting function of the seatbelt retractor 100 is needed. As indicated previously, the torsion bar 174 can be complex and expensive to form, and generally is not easily adaptable to different conditions, such as different vehicle characteristics, or different sizes and weights of vehicle occupants.

Figure 2:
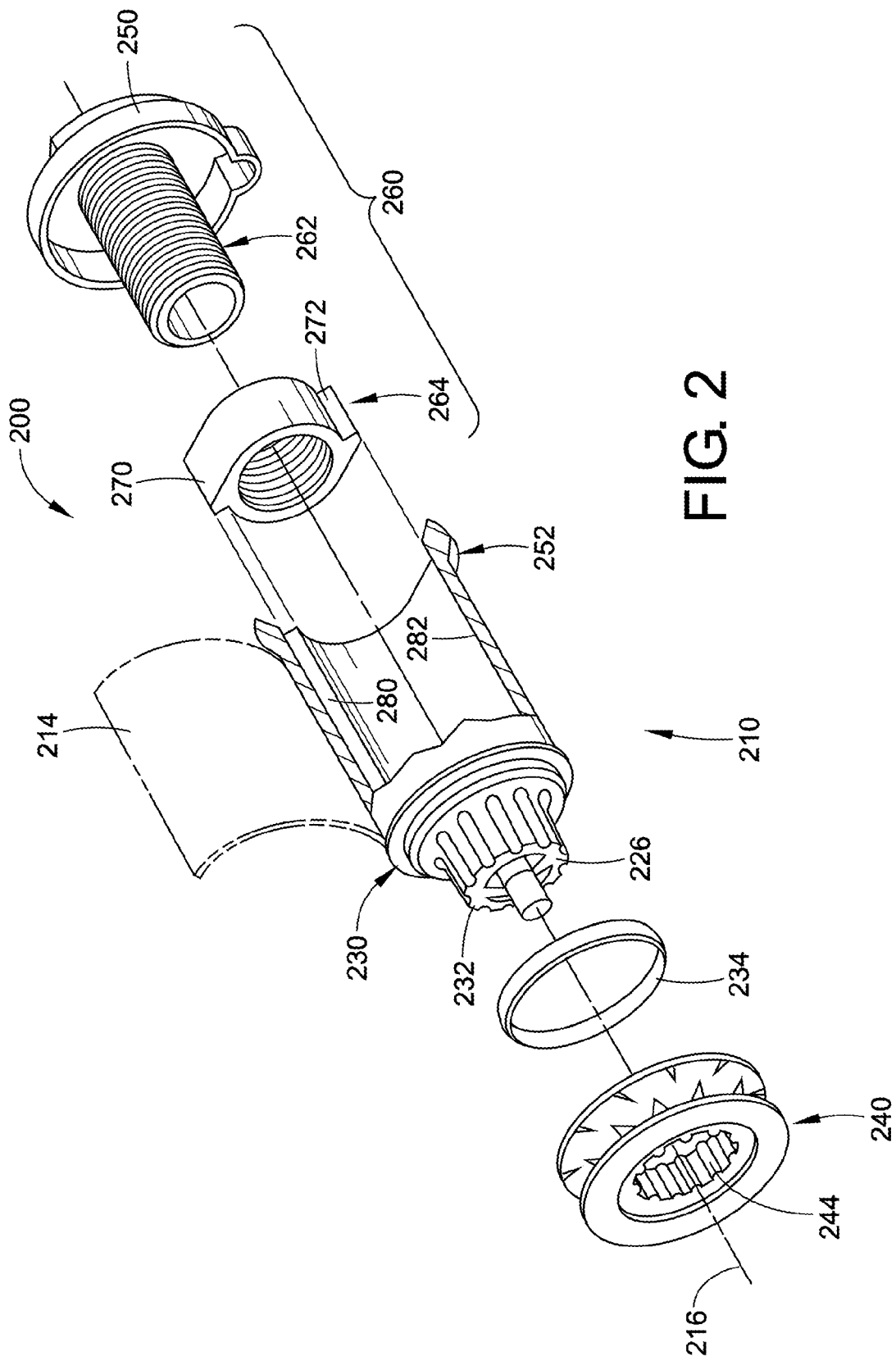
FIG. 2 is an exploded perspective view of an exemplary embodiment of a safety belt retractor.

With reference now to FIG. 2, an exemplary embodiment of a safety belt retractor 200 for a vehicle seatbelt system is illustrated. Similar to seatbelt retractor 100, safety belt retractor 200 includes a spool 210, a safety belt webbing 214 attached to and wound around the spool 210 and a retractor spring (not shown). The spool 210 is configured to rotate about an axis of rotation 216 in a belt retraction direction and a belt withdrawal direction. The spool 210 is rotatable to wind in the webbing under the action of the retractor spring and to payout the webbing under the influence of forwardly directed movement of a vehicle occupant. A drive gear 226 can be integrally formed on a first end 230 of the spool 210 and includes a plurality of drive teeth 232. A ring 234 positioned on the spool 210 surrounds the drive gear 226. A sleeve 240 is supported on the spool 210. The sleeve 240 includes teeth 244 that matingly engage the teeth 232 of the drive gear 226. A fixed member or stopper 250 is connected to a second end 252 of the spool 210.

The safety belt retractor 200 further includes an attenuated seatbelt stopper or force limiting device 260 to limit the load experienced by the vehicle occupant due to the webbing 214 in the event of a vehicle collision. The force limiting device 260 comprises a shaft 262 connected to the fixed member 250. The shaft 262 extends at least partially through the spool 210. At least a portion of the shaft 262 is threaded. A coupling or nut 264 having an internal thread threadedly engages the shaft 262. The coupling 264 is operatively connected to the spool 210 and is configured to move along the longitudinal extent of the shaft 262 towards the fixed member 250 during payout of the webbing 214.

In the depicted embodiment, the coupling 264 includes at least one wing 270 for engaging the spool 210 for rotation therewith. As shown, the coupling includes diametrically opposed wings 270 and 272. The spool 210 includes diametrically opposed, axially extending grooves 280 and 282 configured to slidingly receive the coupling wings 270 and 272. This cooperative engagement of the wings 270, 272 and grooves 280, 282 allows the coupling 264 to move axially along the shaft 262 towards the fixed member 250 as the spool 210 rotates during payout of the webbing 214. Engagement of the coupling 264 with the fixed member 250 prevents further payout of the webbing 214. As will be discussed in greater detail below, the shaft 262 is configured to limit movement of the coupling 264 along the shaft 262 during payout of the webbing 214 to control effective belt force on the vehicle occupant during a crash condition. This can eliminate the need for a separate torsion bar, which, in turn, reduces the cost and complexity of the safety belt retractor 200. Although, it should be appreciated that the force limiting device 260 can be used with the seatbelt retractor 100.

Figure 3:
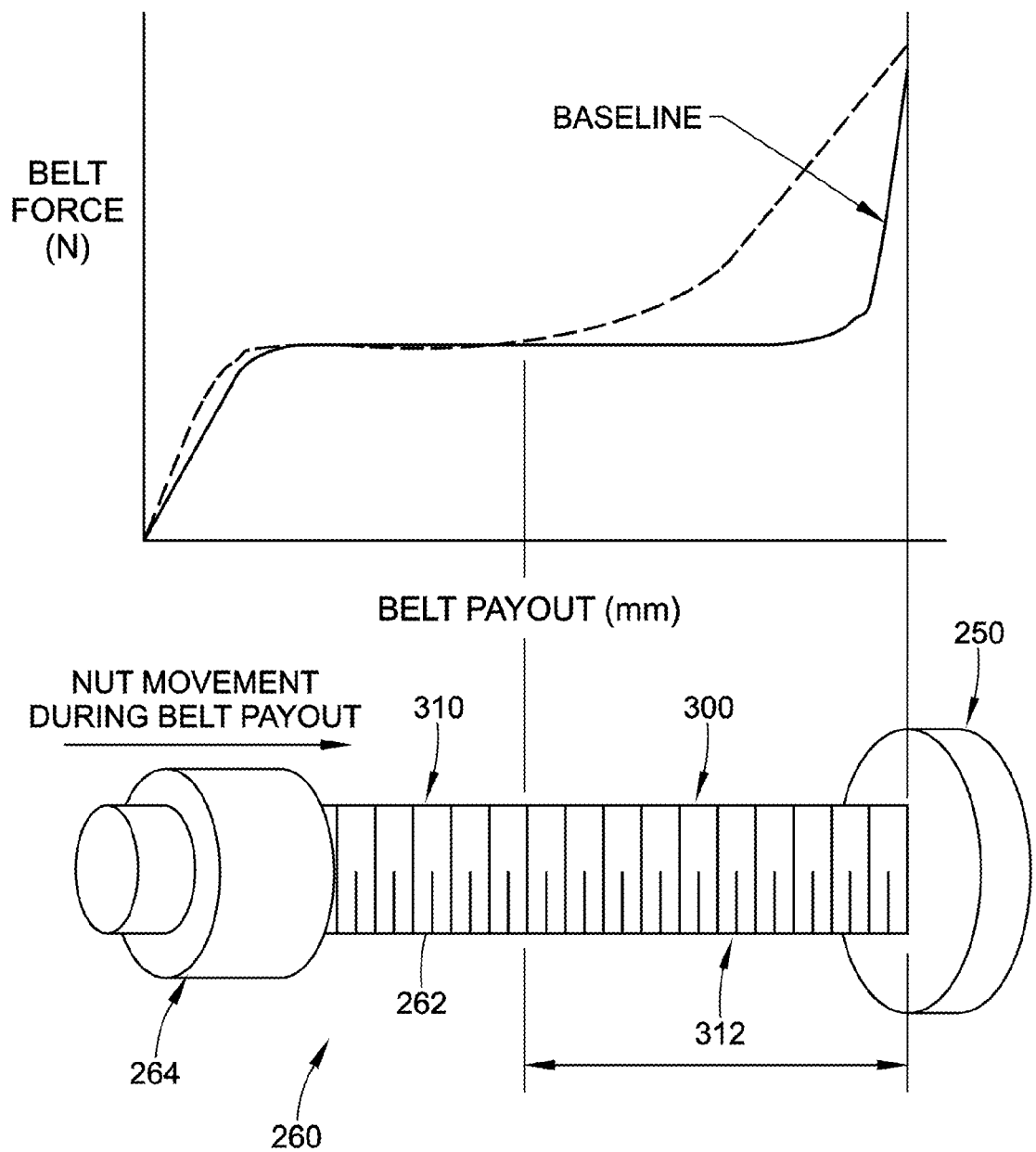
FIG. 3 is a schematic illustration of an exemplary force limiting device for the safety belt retractor of FIG. 2.

With reference to FIG. 3, payout of a belt webbing, such as belt webbing 114 of seatbelt retractor 100, without the exemplary force limiting device 260 is graphically illustrated as a "baseline." In the baseline example, as the spool 110 rotates about the axis of rotation 116 in the belt withdrawal direction, a belt force or load on the vehicle occupant initially increases due to the vehicle occupant moving or tending to move forward as a result of a crash condition. This belt force remains generally constant as the torsion bar 174 rotates and the coupling 160 moves along the longitudinal extent of the threaded shaft 154. During a crash condition, with the seatbelt retractor 100, the belt force exerted on the vehicle occupant can exponentially increase as the coupling 160 engages the fixed member 150.

According to an exemplary embodiment of the force limiting device 260, the spool 210 rotates about the axis of rotation 216 in the belt withdrawal direction. A belt force or load on the vehicle occupant initially increases due to the vehicle occupant moving or tending to move forward as a result of a crash condition. This belt force remains generally constant as the coupling 264 moves along the longitudinal extent of a threaded shaft 262. A threaded portion 300 of the shaft 262 has a thread pitch that differs from a thread pitch of the coupling 264 for increasing the force required to turn the coupling 264 on the shaft during payout of the webbing 214. Engagement of the coupling 264 with the threaded portion 300 at least partially deforms the threaded portion 300 allowing payout of the webbing 214 generally in proportion to the forwardly directed movement of the vehicle occupant during the crash condition. Particularly, as shown in FIG. 3, the threaded portion 300 of the shaft 262 includes a first threaded section 310 and a second threaded section 312. The first threaded section 310 has a first, generally constant thread pitch. The second threaded section 312 is located adjacent to the fixed member 250 and has a second thread pitch. As the coupling 264 engages the first thread pitch of the first threaded section 310, the force to turn the coupling 264 initially increases due to deformation of threads. This force remains generally constant as the coupling 264 moves along a longitudinal extent of the first threaded section 310 thereby providing a generally constant belt force on the vehicle occupant.

As shown in the graph of FIG. 3, to provide an increasing yet controlled belt force on the vehicle occupant during a crash condition, the second thread pitch varies along a longitudinal extent of the second threaded section 312 (i.e., the second thread pitch at least partially increases or decreases along the second threaded section). During a crash condition, the coupling 264 threadedly engages the second threaded section 312 of the shaft 262. As the coupling 264 engages the varying second thread pitch, the force to turn the coupling 264 further increases due to deformation of threads. As the threads of the second threaded section 312 are being deformed by the coupling 264, energy is being dissipated or absorbed. The increased torque required to turn the coupling 264 on the second threaded section 312 is transferred to the spool 210. This transferred reaction force or torque acting on the spool 210 provides a controlled, limited load or force which acts in opposition to the vehicle occupant load and on the extension of the seat belt webbing 214.

As indicated previously, the force limiting device 260 can be implemented in the seatbelt retractor 100 to prevent an exponentially increase of belt force exerted on the vehicle occupant as the coupling 160 engages the fixed member 150. Particularly, shaft 154 can be replaced with shaft 260. Because the torsion bar 174 can provide a generally constant belt force on the occupant (see the baseline example of FIG. 3), the first threaded section 310 of the shaft can have a thread pitch generally equal to the thread pitch of the coupling 160. This allows the coupling 160 to freely move along the first threaded section 310 towards the second threaded section 312. The increasing belt force in the second threaded section 312 increases the restraining forces on the vehicle occupant to prevent the very high belt forces which can be exerted on the vehicle occupant as the coupling 160 engages the fixed member 150.

Figure 4:
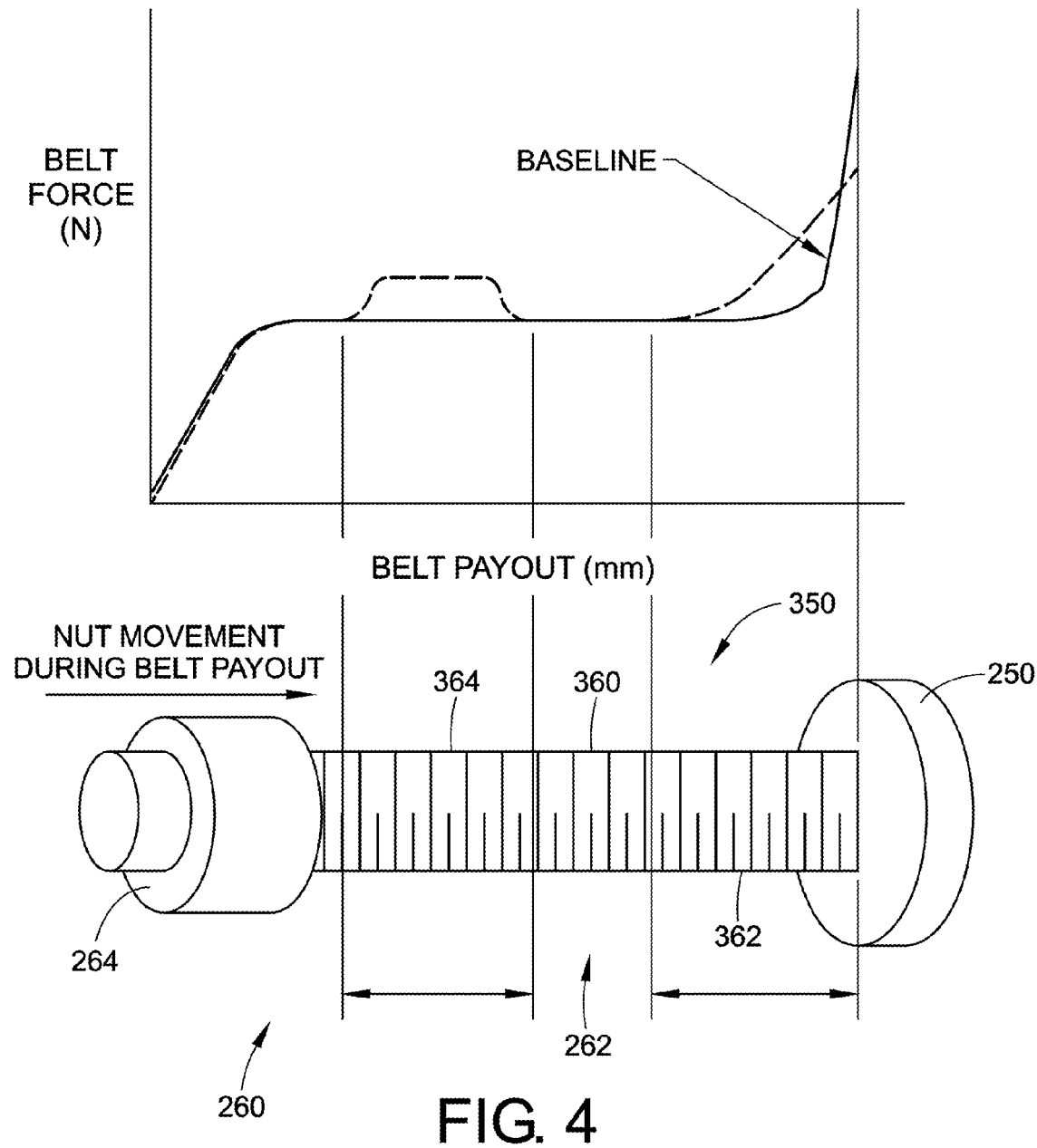
FIG. 4 is a schematic illustration of another exemplary force limiting device for the safety belt retractor of FIG. 2.

With reference to FIG. 4, another exemplary embodiment of the force limiting device 260 for the safety belt retractor 200 is schematically illustrated. Similar to the previous embodiment, a portion 350 of the shaft 262 has a varying thread pitch along its longitudinal extent for crash performance. The coupling 264, which is operatively connected to the spool 210, moves toward the fixed member 250 during payout of the webbing. Engagement of the coupling 264 with the varying thread pitch of the shaft 262 increases the force required to turn the coupling 264 on the shaft 262 during payout of the webbing 214 which, in turn, controls effective belt force on the vehicle occupant.

According to this exemplary embodiment of the force limiting device 260, the threaded portion 350 of the shaft 262 includes a first threaded section 360 having a first thread pitch, a second threaded section 362 having a second thread pitch, and a third threaded section 364 having a third thread pitch. As graphically shown in FIG. 4, the first thread pitch of the first threaded section 360 is generally constant along a longitudinal extent of the first threaded section 360. Engagement of the coupling 264 with the first threaded section 360 at least partially deforms the threads of the first threaded section 360 which provides a generally constant belt force on the vehicle occupant. The second thread pitch of the second threaded section 362 varies along a longitudinal extent of the second threaded section 362 to provide a gradually increasing belt force on the vehicle occupant during a crash condition. As the coupling 264 moves towards the fixed member 250, the coupling engages the variable thread pitch of the second threaded section 362 and at least partially deforms the threads such that the force to turn the coupling 264 increases. Again, this increased force allows a limited controlled further payout of the webbing 214 to increase the restraining forces on the vehicle occupant during a crash condition. This prevents very high belt forces from being exerted on the vehicle occupant as the coupling 264 engages the fixed member 250.

The third thread pitch of the third threaded section 364 is also generally constant along a longitudinal extent of the third threaded section 364 to provide a generally constant belt force on the vehicle occupant which is greater than the belt force of the first threaded section 360. Particularly, engagement of the coupling 264 with the third threaded section 364 at least partially deforms the threads of the third threaded section 364. This deformation of the third threaded section 364 provides an initial increase in belt force on the vehicle occupant for a predetermined amount of initial payout of the webbing 214. As shown, the third threaded section 364 can have a longitudinal length less than a longitudinal length of the second threaded section 362 and is located along the longitudinal extent of the first threaded section 364.

Figure 5:
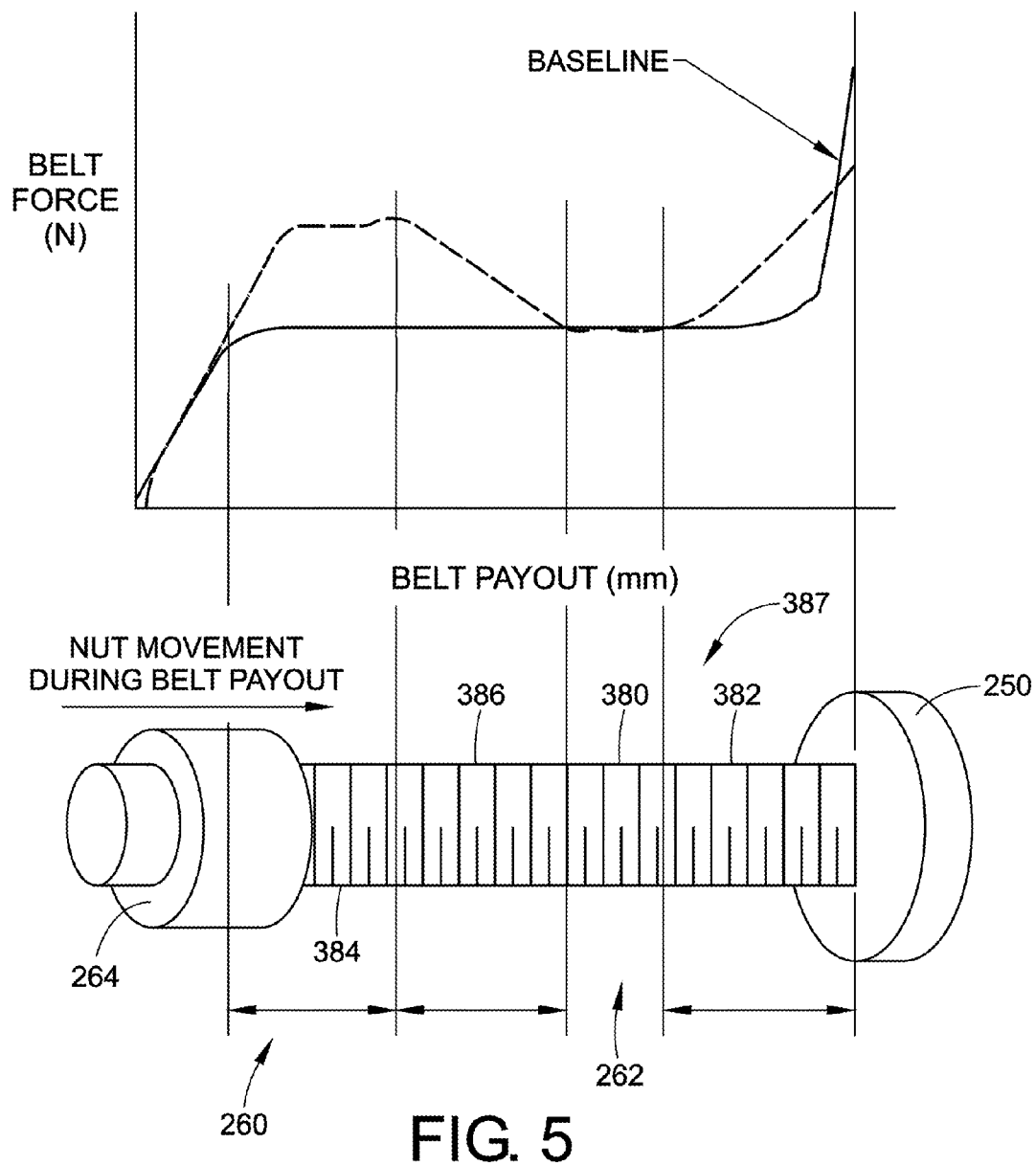
FIG. 5 is a schematic illustration of yet another exemplary force limiting device for the safety belt retractor of FIG. 2.

With reference to FIG. 5, another exemplary embodiment of the force limiting device 260 for the safety belt retractor 200 is schematically illustrated. Similar to the embodiment of FIG. 4, a threaded portion 378 of the shaft 262 includes a first threaded section 380 having a first thread pitch, a second threaded section 382 having a second thread pitch, and a third threaded section 384 having a third thread pitch. As graphically illustrated in FIG. 5, the first thread pitch of the first threaded section 380 is generally constant along a longitudinal extent of the first threaded section 380. Engagement of the coupling 264 with the first threaded section 380 at least partially deforms the threads of the first threaded section 380 for providing a generally constant belt force on the vehicle occupant. The second thread pitch of the second threaded section 382 varies along a longitudinal extent of the second threaded section 382 to provide a gradually increasing belt force on the vehicle occupant during a crash condition. The third threaded section 384 provides an initial generally constant increase in belt force on the vehicle occupant for a predetermined amount of initial payout of the webbing 214. In this embodiment, the threaded portion 378 of the shaft 262 further includes a fourth threaded section 386 having a fourth thread pitch. The fourth threaded section 386 is located between the third threaded section 384 and the first threaded section 380. The fourth thread pitch varies along a longitudinal extent of the fourth threaded section 386. However, the fourth thread pitch is varied with displacement such that the belt force on the vehicle occupant decreases from the generally constant belt force of the third threaded section 384 to the generally constant belt force of the first threaded section 380.

As is evident from the foregoing, a method of controlling seatbelt force on a vehicle occupant during a crash condition is provided. A threaded shaft 262 is provided. An internally threaded coupling 264 is threadedly engaged on the shaft. The coupling 264 is operatively connected to a spool 210 of a seatbelt retractor 200 such that the coupling 264 moves along the shaft 262 as the spool 210 rotates to payout webbing 214 under the influence of forwardly directed movement of a vehicle occupant. A thread pitch of a section of the shaft 262 is varied. The coupling 264 is moved along the longitudinal extent of the shaft 262. Engagement of the coupling with this threaded section of the shaft 262 at least partially deforms the threads of this section allowing payout of the webbing generally in proportion to the forwardly directed movement of the vehicle occupant during the crash condition. Therefore, the force required to rotate the coupling 264 on the shaft 262 during a crash condition is increased to control the rate of increase of belt force on the vehicle occupant.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A force limiting device for use with a safety belt retractor, the safety belt retractor including a spool, a safety belt webbing attached to and wound around the spool, the spool being rotatable to wind in the webbing and to payout the webbing under the influence of forwardly directed movement of a vehicle occupant, the force limiting device comprising:
a fixed member;
a shaft connected to the fixed member, at least a portion of the shaft is threaded; and
a coupling received on the shaft and having an internal thread for threadedly engaging the threaded portion of the shaft, the coupling being configured to move along a longitudinal extent of the shaft, the coupling being operatively connected to the spool and moving towards the fixed member during payout of the webbing, engagement of the coupling with the fixed member preventing further payout of the webbing,
wherein the threaded portion of the shaft includes a first threaded section having a first thread pitch and a second threaded section having a second thread pitch, each of the first thread pitch and the second thread pitch differs from a thread pitch of the coupling to limit movement of the coupling along the longitudinal extent of the shaft during payout of the webbing by increasing the force required to turn the coupling on the threaded portion of the shaft, the first threaded section providing a generally constant belt force on the vehicle occupant, the second threaded section providing an increasing belt force on the vehicle occupant.

2. The force limiting device of claim 1, wherein the first thread pitch is generally constant along a longitudinal extent of the first threaded section and the second thread pitch varies along a longitudinal extent of the second threaded section.

3. The force limiting device of claim 1, wherein engagement of the coupling with the threaded portion of the shaft during a crash condition at least partially deforms the threaded portion allowing payout of the webbing generally in proportion to the forwardly directed movement of the vehicle occupant during the crash condition.

4. The force limiting device of claim 1, wherein the second threaded section is adjacent to the fixed member.

5. The force limiting device of claim 1, wherein the threaded portion of the shaft includes a third threaded section having a third thread pitch, wherein engagement of the coupling with the third threaded section at least partially deforms the third threaded section to provide an initial increase in belt force greater than the belt force of the first threaded section on the vehicle occupant for a predetermined amount of initial payout of the webbing.

6. The force limiting device of claim 5, wherein the third threaded section is located along the longitudinal extent of the first threaded section.

7. The force limiting device of claim 5, wherein the third thread pitch is generally constant along a longitudinal extent of the third threaded section for providing a generally constant belt force on the vehicle occupant.

8. The force limiting device of claim 5, wherein the third threaded section has a longitudinal length less than a longitudinal length of the second threaded section.

9. The force limiting device of claim 5, wherein the threaded portion of the shaft includes a fourth threaded section having a fourth thread pitch, the fourth thread pitch varying along a longitudinal extent of the fourth threaded section.

10. The force limiting device of claim 9, wherein the fourth threaded section is located between the third threaded section and the first threaded section, the fourth thread pitch being varied with displacement such that the belt force on the vehicle occupant decreases.

11. An attenuated seatbelt stopper operatively connected to a spool of a seatbelt retractor for limiting rotation of the spool during a crash condition, the seatbelt stopper comprising:
a fixed member;
a threaded shaft connected to the fixed member, a section of the shaft having a varying thread pitch along its longitudinal extent for crash performance; and
an internally threaded coupling threadedly received on the shaft, the coupling being operatively connected to the spool and moving toward the fixed member during payout of the webbing, engagement of the coupling with the fixed member preventing further payout of the webbing,
wherein engagement of the coupling with the varying thread pitch of the shaft increases the force required to turn the coupling on the shaft during payout of the webbing which, in turn, controls effective belt force on the vehicle occupant.

12. The force limiting device of claim 11, wherein the shaft includes a first threaded section having a first generally constant thread pitch for providing a generally constant first belt force on the vehicle occupant, and a second threaded section having a second thread pitch for providing a second, increasing belt force on the vehicle occupant, the second thread pitch varying along a longitudinal extent of the second threaded section.

13. The force limiting device of claim 12, wherein the shaft includes a third threaded section having a third thread pitch, wherein the third thread pitch is generally constant along a longitudinal extent of the third threaded section for providing a generally constant third belt force on the vehicle occupant for a predetermined amount of initial payout of the webbing, the third belt force being greater than the first belt force.

14. The force limiting device of claim 13, wherein the shaft includes a fourth threaded section having a fourth thread pitch, the fourth threaded section being located between the third threaded section and the first threaded section, the fourth thread pitch being varied with displacement along a longitudinal extent of the fourth threaded section such that the belt force on the vehicle occupant decreases from the third belt force to the first belt force.

15. A method of controlling seatbelt force on a vehicle occupant during a crash condition comprising:
providing a threaded shaft and an internally threaded coupling, the coupling being threadedly engaged on the shaft;
operatively connecting the coupling to a spool of a seatbelt retractor such that the coupling moves along the shaft as the spool rotates to payout webbing under the influence of forwardly directed movement of a vehicle occupant;
moving the coupling along a longitudinal extent of the shaft; and
increasing the force required to move the coupling along the shaft during a crash condition to control a rate of increase of belt force on the vehicle occupant by changing a thread pitch of a portion of the threaded shaft along the longitudinal extent of the shaft.

16. The method of claim 15, further including varying a thread pitch of a portion of the threaded shaft to form a first threaded section having a generally constant first thread pitch and a second threaded section having a varying second thread pitch, wherein engagement of the coupling with the portion of the threaded shaft at least partially deforms the threads of the first and second threaded sections allowing payout of the webbing generally in proportion to the forwardly directed movement of the vehicle occupant during the crash condition.

17. The method of claim 16, further including varying a thread pitch of a portion of the threaded shaft to form a third threaded section having a generally constant third thread pitch to provide an initial increase in belt force.

18. The method of claim 17, further including varying a thread pitch of a portion of the threaded shaft to form a fourth threaded section having a varying fourth thread pitch to provide a decrease in belt force.

* * * * *